UNITED STATES PATENT OFFICE.

ALBERT FRIEDRICH ECKHARDT, OF HAMBURG, GERMANY.

IMPROVED SYSTEM OF SEEDING AND MANURING.

Specification forming part of Letters Patent No. 82,503, dated September 29, 1868.

*To all whom it may concern:*

Be it known that I, ALBERT FRIEDRICH ECKHARDT, a citizen of Hamburg, Germany, have invented a new and Improved System of Seeding and Manuring, for use in farming and gardening; and I hereby declare that the following is a full and exact description thereof.

The nature of my invention consists in securing to the seed, for the whole period of their growth, all the manure which they may need, in such a manner that it cannot be washed away by rain or flood, this being accomplished by enveloping the already-manured seed in a permanent case or capsule, insoluble in water.

To enable others skilled in the art to make and use my invention, I will proceed to describe its principles, composition, manufacture, and operation.

All chemists agree that, in the cultivation of plants, the soil is to be considered only as their pedestal or base. They have all laid down the following proposition: Give to arable land those mineral substances which the plant contains, and afterward the substances necessary for the growth of the plant; it will then grow anywhere and everywhere, if the climatic relations or circumstances permit its growth.

In farming, heretofore, the ground has been provided with the mineral substances needed by the plant. Grain has been covered with chlorate of potash, macerated with diluted sulphuric acid; but rain and flood have washed them away. No one has hitherto given to the seed all its manure for the whole time of its growth. I have discovered how to manure a seed perpetually. This is my invention.

To describe the manner of applying my invention, I will select from the innumerable seeds the best grain, viz., wheat. Throw a hundred pounds of wheat into a reservoir of water in which potash has been dissolved, the solution being strong enough to bear an egg. When the wheat is moistened, throw it into a kettle containing bone-dust. By the rotation of the kettle, put the grains of wheat in motion, and thus coat them with bone-dust. When this coating of bone-dust is firm and solid, take the wheat out of the kettle, put it in a sieve, and sift off the bone-dust that does not adhere to it. Then moisten it with a solution of potash in water, throw it again into the kettle, throw ashes on it, thus moistened, till all the seeds are well enveloped in ashes, and then moisten it again with potash-water. Then throw it, so moistened, again into the kettle containing powdered lime, and envelop the seeds afresh with lime. Afterward moisten the grain with potash-water and throw over it a handful of sulphur. In order to dry it completely, throw upon it sulphate of magnesia. Then moisten it again with potash-water and throw upon it powdered plaster and phosphate of lime. The plaster is absorbed by the moisture, and is agglutinated or cemented—that is, it forms a hard crust around the seeds. The grain is then thrown out of the kettle, and dried for about two hours. Then the plaster crust is moistened with a solution of ammonia, and the moist body again powdered with plaster, whereby a plaster crust is formed which has many advantages, viz: Plaster is known to be a very good manure; it attracts to itself the moisture of the atmosphere, (dew;) it holds together the mineral substances that nourish the plant; it keeps the salts constantly moist, in a fluid state; and it prevents the washing away of the manure by overflow and hard rain. Thus the manured seeds constantly retain the necessary nourishment, and can therefore be planted in fallow or otherwise unfruitful ground.

Learned men have discovered all the mineral and other substances needed in each plant; but no one before me has invented a way of concentrating and fixing these substances. I believe that my seed-manuring method has a great future before it, and it will be a blessing to mankind.

Seed manured according to my invention is rendered, by the plaster case or capsule, very durable, and fitted for transportation.

The following are the advantages which the farmer will derive from my invention:

First. He need not let any ground lie fallow. One hundred pounds of seed-wheat cost, in Germany, five Prussian thalers, (about five dollars United States paper currency.) Five hundred pounds of manure for the same, as above described, with cost of labor, cost twelve Prussian thalers. From these one hundred pounds the farmer gets a crop of nine hundred pounds, worth forty-five thalers, for an outlay of seventeen thalers, on fallow land, that otherwise brings in nothing.

Second. With my invention, the farmer escapes the great damage to his grain caused by bugs, worms, and insects, which, under the old system, are brought upon his land with the manure.

Third. Under the old system of manuring the farmer brings upon his ground parasitical plants and funguses with the manure. These, blown about by the wind, cause disease in his grain and potatoes. The diseased stalks are thrown on the manure heaps, and thus disease is again, in the following year, carried into the fields. All this is avoided under my system.

Fourth. Under the old system the farmer has to nourish with manure all manner of weeds, that often choke the grain by their luxuriant growth, and sometimes poisonous weeds get mixed with the food of man and beast, and poison them. Under my invention the useful plants get all the nourishment; the weeds, none.

Fifth. My invention wholly prevents all the great loss that farmers, under the old system, suffer from weevils, which destroy their leguminous plants, (peas, &c.)

Sixth. Under the old system the farmer must feed with his grain thousands of birds, field-mice, and other creatures. Under my system not one seed is consumed by these uninvited guests.

Seventh. On poor ground, on which otherwise only lupines, oats, &c., can grow, the farmer can, with my invention, raise with but little expense and labor the most profitable grain and plants, such as tobacco, hops, sweet turnips, corn, &c.

Eighth. Every farmer looks anxiously to the future, because farming brings in a constantly-decreasing percentage of profit, as manure is becoming too dear under the present old system. On a Prussian "morgen" (acre) of tolerably good land there are needed, under the old system, six cart-loads, of twenty "centners" (hundredweights) each, of stable manure, making in all one hundred and twenty centners. The hauling, unloading, spreading, and turning under of the manure cost enormously. With my application of the manure, instead of one hundred and twenty centners, only five centners to every hundred pounds of wheat on fallow ground are necessary. I will show that these five hundred pounds, or five centners, are even more than the grain needs. In chemical writings it is established that the crop of wheat produced on a French "hectare," or four Prussian morgen, (acres,) contains about three hundred and fifty-one pounds of mineral constituents, of which one hundred and twelve pounds are phosphates. So a Prussian morgen may contain ninety pounds of mineral constituents and twenty-eight pounds of phosphates. But I give over two hundred and fifty pounds of constituents, of which over fifty pounds are phosphates. With these I manure fallow ground. The ground is plowed, harrowed, and seeded by drilling, and then the work is complete.

What I claim as my invention, and desire to secure by Letters Patent, is—

The covering of artificially-manured seed of all kinds with a case or capsule, insoluble in water, as herein described, using for that purpose the aforesaid process and compound, or any other substantially the same and which will produce the intended effect.

ALBERT FRIEDRICH ECKHARDT.

Witnesses:
  C. HOFFMANN,
  TH. A. REICHERT.